United States Patent
Joong et al.

(10) Patent No.: US 7,295,540 B2
(45) Date of Patent: Nov. 13, 2007

(54) SIGNALING WIRELESS WIDE AREA NETWORK MECHANISM FOR A TERMINAL LOCATED IN A WIRELESS LOCAL AREA NETWORK

(75) Inventors: Donald Joong, Montreal (CA); Raj Sanmugam, Cornwall (CA); Samy Touati, Rosemere (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1062 days.

(21) Appl. No.: 10/226,334

(22) Filed: Aug. 23, 2002

(65) Prior Publication Data
US 2004/0037255 A1    Feb. 26, 2004

(51) Int. Cl.
*H04Q 7/24* (2006.01)
(52) U.S. Cl. .................................... 370/338; 370/349
(58) Field of Classification Search ........ 370/352–356, 370/338, 328, 329, 349, 341, 401, 465, 466, 370/467
See application file for complete search history.

(56) References Cited
U.S. PATENT DOCUMENTS
6,353,745 B1    3/2002  Wehrend et al. ............ 455/466

2004/0114553 A1*    6/2004  Jiang et al. .................. 370/328
2005/0286466 A1*  12/2005  Tagg et al. .................. 370/329
2006/0025175 A1*    2/2006  Lapstun et al. ........... 455/556.1

FOREIGN PATENT DOCUMENTS

| DE | 100 04 032 A1 | 8/2001 |
| EP | 1 106 025 B1 | 2/2002 |
| WO | WO 01/22691 A2 | 3/2001 |

\* cited by examiner

*Primary Examiner*—Ajit Patel
(74) *Attorney, Agent, or Firm*—Ericsson Canada Inc.

(57) ABSTRACT

The present invention relates to a text control message for carrying control information from a Wireless Wide Area Network (WWAN) to a terminal in a Wireless Local Area Network (WLAN). The text message has a code for indicating to the terminal that the text message contains control information and a text portion being the control information. A logical node located in WWAN that sends control information to a terminal located in a WLAN. The logical node receives information regarding the terminal from a Wireless Serving Node (WSN) located in the WLAN. The logical node has knowledge of an access point connected to the WSN that currently serves the terminal in the WLAN. The logical node triggers, in a message center of the WWAN, the sending of the text message to the terminal.

10 Claims, 2 Drawing Sheets

SIGNALING WIRELESS WIDE AREA NETWORK MECHANISM FOR A TERMINAL LOCATED IN A WIRELESS LOCAL AREA NETWORK

BACKGROUND OF THE INVENTION

1. Field of the Invention

The invention relates to a signaling mechanism between different types of networks such as a Wireless Local Area Network and a Wireless Wide Area Network.

2. Description of the Related Art

Today, there exist many types of wireless networks such as Wireless Local Area Networks (WLANs) that are used to provide coverage in smaller areas such as building or plants. Other basic types of Wireless Networks include the Wireless Personal Area Network (WPAN) such as Bluetooth™ or the Wireless Wide Area Network (WWAN), which covers large geographic areas.

On one hand, WLANs are deployed by hotspot service providers in different public places such as shopping mall, hotels or airports. A WLAN allows a user of a wireless client (laptop or desktop computer equipped with PC or PCI cards) to access a plurality of services. More particularly, PC or PCI cards receive radio signals from an access point with which it is communicating and translates that signal into digital data that PCs can understand. In the WLAN, access points are provided for granting access to the user. Access points are hard-wired to a LAN. Using an ordinary RJ-45 cable, it is possible to connect an access point to a wired LAN such as an Ethernet network. Also, access points can be described as software that run on a server, however the vast majority of access points are separate pieces of hardware. Access points translate digital data from the network into radio signals that wireless clients can understand for providing services to a user, while within the coverage of the WLAN.

WLANs use unregulated frequencies. For example access points and wireless clients can communicate over channels within a 2.4 GHz frequency band. Channel 2 in the 2.4 GHz band runs specifically at 2.402 GHz. Channel 3 runs at 2.403 GHz. The 2.4 GHz frequency band has a total of 80 channels, however some countries such as the United States and Canada allow the use of different frequencies. In these mentioned countries channels 1 through 11 are used.

On the other hand, WWANs generally use digital cellular phone networks to enable wireless clients to access among other things the Internet across extensive geographic areas. Unlike WLANs, which offer limited user mobility, WWANs facilitate connectivity for mobile users, and use regulated frequencies.

In WWANs, communication occurs predominantly through the use of radio signals over different types of networks such as analog or digital cellular. As it is well known today, many wireless data communication takes place across 2G (second generation) networks such as TDMA (Time Division Multiple Access), CDMA (Code Division Multiple Access), GSM (Global System for Mobile Communication), and PDC (Pacific Digital Cellular (GSM in Japan)), or through packet-data technology over old analog systems such as CDPD (Cellular Digital Packet Data) overlay on AMPS (Advanced Mobile Telephone Service). Although traditional analog networks have been designed for voice rather than data transfer this causes some inherent problems. Some 2G and/or new 3G (third generation) digital cellular networks such as CDMA2000 or UMTS (Universal Mobile Telecommunication System) are fully integrated for data/voice transmission. Therefore, it is possible to develop 3G Wireless Wide Area Network (3G WAN).

Nowadays, 3G networks (3G WWAN) operators offer many services. However, WLAN access and 3G WWAN access are completely independent access technologies. Therefore, 3G WWANs require a complement such as a Multi-Access Environment for allowing mobile users to roam from a WLAN to a 3G WWAN and vice versa. For doing so, the Multi-Access Environment uses a technology called MobileIP for allowing roaming issues. With this complement, users may roam back and forth from a WLAN to a 3G WWAN. However, even thought the user is allowed to roam from the WLAN to the 3G WWAN, the operator is not able to manage roaming in the WLAN in view of security and billing purposes. Therefore, there is a need to improve signaling between WLANs and 3G WWANs. The invention provides a solution to this problem.

SUMMARY OF THE INVENTION

It an object of the present invention to provide a logical node located in a WWAN for sending control information to at least one terminal located in a WLAN. The logical node receives information regarding the at least one terminal from a Wireless Serving Node (WSN) located in the WLAN. The logical node is further being capable of having knowledge of an access point currently serving the terminal in the WLAN while being connected to the WSN. The logical node further triggers in a message center of the WWAN the sending of a text message including a code indicating to the at least one terminal that the text message contains control information and a text portion being the control information at a message center for the at least one terminal based on the collected information.

It is a further object of the present invention to provide a terminal for receiving control information from a WWAN while located in a WLAN. The terminal is capable of receiving a text message including a code for indicating to the terminal that the control message contains control information. The text message further includes a text portion being the control information.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
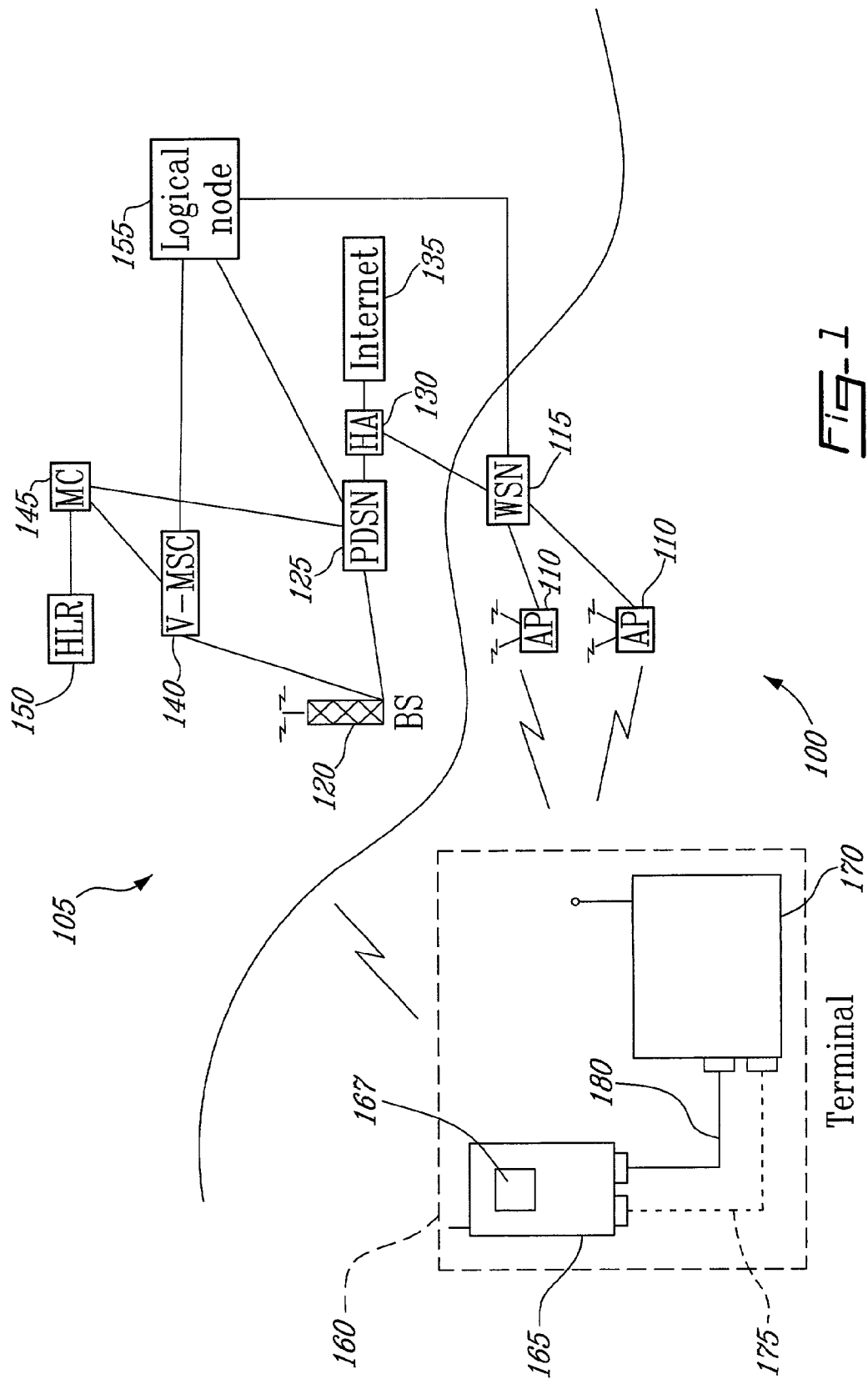
FIG. 1 is illustrating a terminal currently roaming in a Wireless Local Area Network WLAN.

Reference is now made to FIG. 1, which illustrates a terminal 160 that is currently roaming in a Wireless Local Area Network (WLAN) 100. The terminal 160 is registered in a third generation Wireless Wide Area Network (3G WWAN) 105. The terminal 160 is operable in the WLAN 100 and in the 3G WWAN 105 and comprises a mobile device 165 for receiving messages from the 3G WWAN 105. The mobile device further stores these messages in an internal memory 167. The terminal also comprises a wireless client 170 for receiving messages from the WLAN 100 and for accessing the memory 167 and for interpreting messages stored in the memory 167. The mobile device 165 can be for example a mobile telephone or a Personal Data Application (PDA) and the wireless client 170 can be for example a laptop computer or desktop computer equipped with an access card. Furthermore, the mobile device 165 and the wireless client 170 are connected via a wireless connection 175 or via a wired connection 180. The wireless connection 175 can be made with Bluetooth™ or similar infrared devices while the wired connection 180 can be made with an ordinary RS-232C serial cable or any other existing cable that can support a wired connection between the mobile device 165 and the wireless client 170.

The terminal 160 is registered in the third generation 3G WWAN 105. The exemplary 3G WWAN 105 comprises at least one Base Station (BS) 120 for receiving signals from the terminal 160 and sending signals to the terminal 160 over an air interface. The BS 120 is ultimately connected to a Packet Data Serving Node (PDSN) 125, for providing data packet services to the terminal 160. The PDSN 125 is connected to a Home Agent (HA) 130 for providing a link to the Internet 135. The BS 120 is also connected to a Visitor Mobile Switching Center (V-MSC) 140. The PDSN 125 and the V-MSC 140 are connected to a Logical Node (LN) 155 and a Message Center (MC) 145 for generating messages to the terminal 160. In FIG. 1, the MC 145 is connected to a Home Location Register (HLR) 150 for obtaining location information for at least one terminal. The present invention is not limited to the number of nodes or the shown nodes or connections in FIG. 1.

Since the terminal 160 is registered in the 3G WWAN 105, the terminal 160 accesses the WLAN 100 in a Multi-Access Environment. This access is granted via at least one of possibly many APs 110. The AP 110 acts as an authenticator for the terminal 160 in the WLAN 100. The AP 110 such as other APs 110 located in the WLAN 100 are connected to a Wireless Serving Node (WSN) 115. The WSN 115 is connected to the HA 130 for providing a link to the Internet 135. The WSN 115 also communicates and sends information to the LN 155 and later grants access to the WLAN 100 to the terminal 160. More particularly, the terminal 160 obtains access to the WLAN 100 by sending a request for services to the AP 110. Following this, the AP 110 receives the request for services from the terminal 160 and sends an authentication request for granting access to the terminal 160. This authentication request is sent to the WSN 115, which further communicates and sends information to the LN 155 in the 3G WWAN 105 for billing and authentication purposes. The information sent from the WSN 115 to the LN 155 is stating an address of the AP 110 that currently serves the terminal 160. Following a reception of information from the WSN 115, the LN 155 authenticates the terminal 160 and sends a response to the WSN 115. After receiving the response from the LN 155, the WSN 115 forwards the response to the AP 110. Afterwards, the AP 110 sends the response to the terminal 160 and the terminal accesses the WLAN 100.

As an example, the LN 155 can be a node such Authentication, Authorization and Accounting (AAA) server (not shown) in a CDMA2000 network. The AAA server authenticates and authorizes the mobile client, provides user profile and Quality of Service (QoS) information to a PDSN, and stores accounting data regarding registered terminals in its network.

In a Multi-Access Environment, it is advantageous for 3G WWAN operators to be able to control which access medium his subscribers are to access. For example, 3G WWAN operators would wish to control this for quality assurance reason or traffic distribution or dimensioning purposes. Giving the choice to access a 3G WWAN or a WLAN, operators may wish to only redirect traffic on the WLAN network to supplement a limited capacity available on their 3G networks. Therefore, a 3G WWAN operator can be able to monitor the performance and available capacity of its 3G WWAN. When traffic load warrants, service may be off-loaded to a WLAN.

Since WLANs are deployed on unregulated frequencies, a multitude of WLAN hotspot providers with differing WLAN technology may co-exist in a service area of a 3G WWAN. When it comes to handing-off or initiating service on WLAN, 3G WWAN operators would like to instruct which AP in the WLAN his subscribers should be associated with. For doing so, a 3G WWAN operator of the 3G WWAN needs to maintain control of terminals registered in its network and which are in communication with a WLAN. The control of these terminals is maintained via signaling that carry control information.

In addition, QoS type of services and or priority access service may be introduced when a terminal is in communication with the WLAN. Based on a subscription parameter value or network conditions, the terminal may be directed to alter its behavior or limit its bandwidth transmission on an uplink. Furthermore, the terminal behavior may also be altered or modified based on its current location and availability of radio and network resources. This may be especially useful, in high traffic concentration area.

Figure 2:
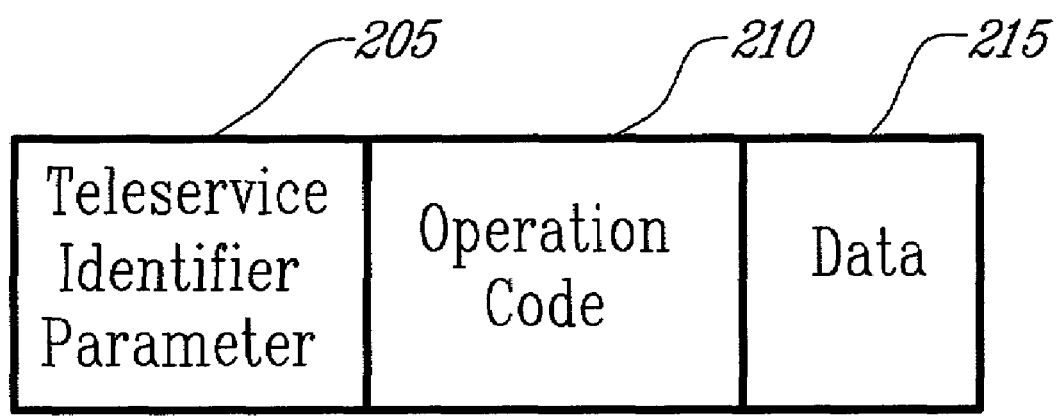
FIG. 2 is a illustrating a short message service message content according to the invention.
Figure 1:
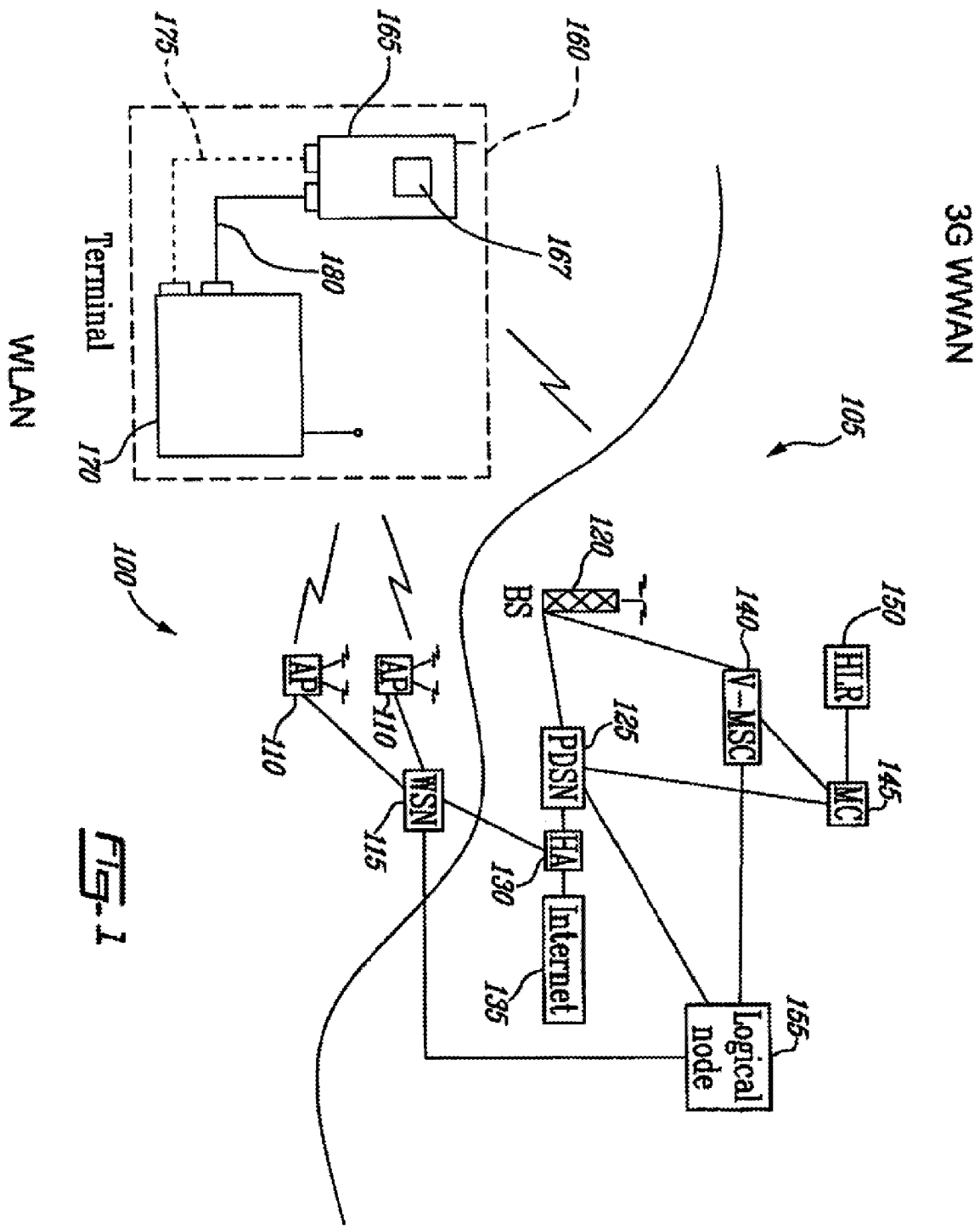
Figure 2:
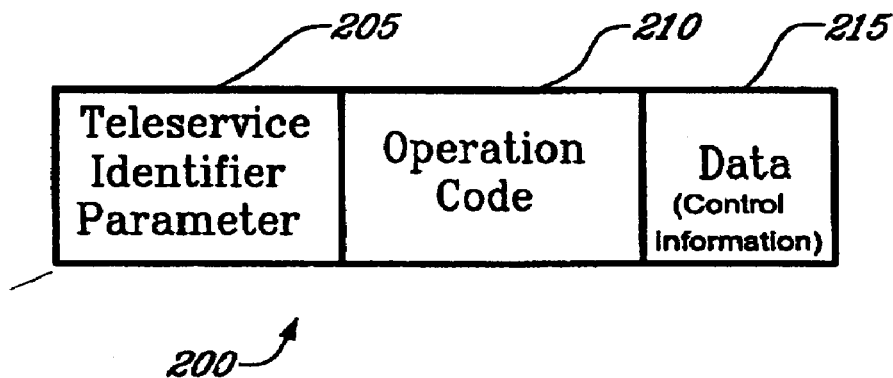

Reference is now made to FIG. 2, which illustrates a short message service (SMS) message content according to the invention, and further to FIG. 1, which illustrates the terminal 160 that is currently roaming in the WLAN 100. The present invention is not limited to SMS, but applicable to any other type of text messages known and used in WWANs to convey text to the terminal. The SMS 200 is used by the 3G WWAN 105 for carrying signaling, such as control information in a way to control a terminal located in the WLAN 100. For being able to be used as a control message, the SMS 200 comprises a Teleservice Identifier parameter 205 for indicating a teleservice for which the SMS 200 message applies. The SMS 200 also comprises an Operation Code parameter 210, which contains control information sent from the 3G WWAN 105 such as a Routing address of the receiving terminal and an Origination address identifying the network node that sends the SMS 200, which is the MC 145 in the present case. The SMS 200 comprises data 215 for defining a text portion of the SMS 200.

The Teleservice Identifier parameter 205 can take different values from 49152 to 65535. A SMS teleserviceID is introduced in the Teleservice Identifier parameter 205 for indicating that the SMS message 200 contains control information for the terminal 160 in a Multi-Access Environment. Typically the payload of such a message would adhere to the following format represented in table 1.

TABLE 1

Example of a Format of a SMS message

| | |
|---|---|
| Operation Code | Octet 1 |
| Number of Parameter | Octet 2 |
| Length of Parameter 1 | Octet 3 |
| Parameter 1 octet 1 | Octet 4 |
| Parameter 1 octet 2 | Octet 5 |
| Length of Parameter 2 | Octet 6 |
| Parameter 1 octet 1 | Octet 7 |

TABLE 1-continued

Example of a Format of a SMS message

| | |
|---|---|
| Parameter 2 octet 2 | Octet 8 |
| Parameter n octet n | Octet n |

The Operation Code in table 1 may take different values such as 0 for a Handover Directive, 1 for a WLAN AP Selection, and 2 for a Data Throughput Directive. In the particular case of a Handoff Directive, there will be 1 parameter used. This parameter indicates whether to handover to WLAN network or to handover to a 3G network. If Parameter 1 is 0, the indication will be a WLAN network handover. However, if the Parameter 1 is 0, the indication will be a 3G network handover. Table 2 below represents a message for instructing a terminal to handover to a WLAN network while table 3 represents a message for instructing a terminal to handover to a 3G network.

TABLE 2

Message for instructing the terminal to handover to a WLAN network.

| | |
|---|---|
| Operation Code | 1 |
| Number of Parameter | 1 |
| Length of Parameter 1 | 1 |
| Parameter 1 octet 1 | 0 |

TABLE 3

Message for instructing terminal to handover to a 3G network.

| | |
|---|---|
| Operation Code | 1 |
| Number of Parameter | 1 |
| Length of Parameter 1 | 1 |
| Parameter 1 octet 1 | 1 |

When the terminal 160 is in communication with the AP 110, the 3G WWAN 105 sends a message such as the SMS 200 for ordering the terminal 160 to access services directly from the 3G WWAN 105 instead of the WLAN 100. The message can also be sent for instructing the terminal 160 to maintain communication with the WLAN 100 or to access the WLAN 100 if the terminal 160 is already in communication with the 3G WWAN 105.

The SMS 200 is sent to the terminal 160 from the 3G WWAN 105 based on a request received at the MC 145. In FIG. 1, the LN 155 is responsible for triggering the SMS 200 at the MC 145. More precisely, the LN 155 triggers in the MC 145 the SMS 200 for sending control information to the terminal 160. The LN 155 triggers the MC 145 based on received and collected information from the WLAN 100 and the 3G WWAN 105. For doing so, the LN 155 sends a request (not shown) including control information to the MC 145. Next, the MC 145 receives the request and includes the control information in the text portion of the SMS 200. Before generating and sending the SMS 200 to the terminal 160, the MC 145 interrogates the HLR 150 for retrieving the location of the terminal 160. Alternatively, the position may also be provided in the request sent from the LN 155 to the MC 145. After retrieving the location of the terminal 160, the MC 145 generates and sends the SMS 200 to the terminal 160.

Upon reception of the SMS 200 at the terminal 160, the mobile device 165 uses the Teleservice Identifier parameter 205 for determining that the SMS 200 contains control information. Following this determination, the mobile device 165 stores the SMS 200 in its memory 167 until the wireless client 170 retrieves it. The wireless client 170 retrieves the SMS 200 by looking periodically in the memory 167 of the mobile device 165. The wireless client 170 further analyzes the SMS 200 and interprets the control information in the SMS 200. This may result in a handover of the terminal 160 from the WLAN 100 to the 3G WWAN 105.

It can be understood that some messages sent from the WLAN to the 3G WWAN and vice versa are not mentioned nor described for clarity reasons. Also some messages sent between some network elements in the 3G WWAN 105 and WLAN 100 are omitted for clarity reasons.

Although several preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

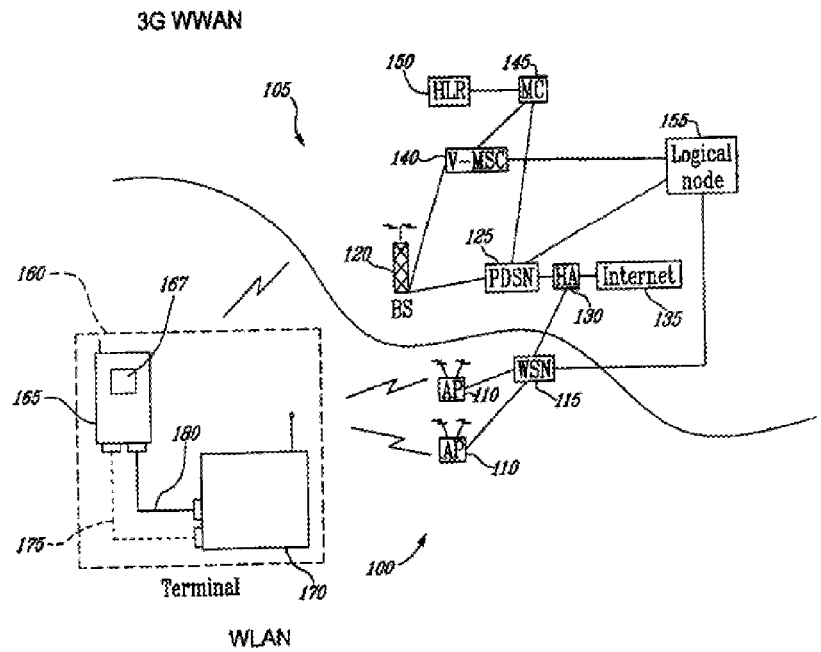

What is claimed is:

1. A logical node located in a Wireless Wide Area Network (WWAN) for sending control information to at least one terminal located in a Wireless Local Area Network (WLAN), wherein the logical node:

receives information regarding the at least one terminal from a Wireless Serving Node (WSN) located in the WLAN;

has knowledge of an access point currently serving the terminal in the WLAN, the access point being connected to the WSN; and triggers in a message center of the WWAN the sending of a text message including a code indicating to the at least one terminal that the text message contains a portion being the control information and a text portion being the control information at the message center for the at least one terminal based on a collected information.

2. The logical node of claim 1, wherein the logical node further perform a hand off operation for the at least one terminal.

3. The logical node of claim 1, wherein the terminal comprises a mobile device having a memory for storing the text message received from the WWAN.

4. The logical node of claim 1, wherein the terminal comprises a mobile device using the code of the text message for storing the text message in a memory.

5. The logical node of claim 1, wherein the terminal comprises an application part connected to a mobile device for looking into a memory of the mobile device.

6. The logical node of claim 1, wherein the terminal comprises an application part for interpreting the control information.

7. The logical node of claim 1, wherein the terminal is operable in the WLAN and the WWAN.

8. The logical node of claim 1, wherein the text message is a Short Message Service (SMS) message.

9. The logical node of claim 1, wherein the text message further ordering the terminal to access the WWAN.

10. The logical node of claim 1, wherein the text message further ordering the terminal to maintain access with the WLAN.

* * * * *

UNITED STATES PATENT AND TRADEMARK OFFICE
CERTIFICATE OF CORRECTION

| | | |
|---|---|---|
| PATENT NO. | : 7,295,540 B2 | Page 1 of 4 |
| APPLICATION NO. | : 10/226334 | |
| DATED | : November 13, 2007 | |
| INVENTOR(S) | : Joong et al. | |

It is certified that error appears in the above-identified patent and that said Letters Patent is hereby corrected as shown below:

The Title page showing an illustrative figure should be deleted and substitute therefor the attached title page.

Delete Drawing sheets 1-2 and substitute therefor the Drawing sheets consisting of FIG 1-2 as shown on the attached pages.

Signed and Sealed this

Thirtieth Day of September, 2008

JON W. DUDAS
*Director of the United States Patent and Trademark Office*

United States Patent
Joong et al.

(10) Patent No.: US 7,295,540 B2
(45) Date of Patent: Nov. 13, 2007

(54) SIGNALING WIRELESS WIDE AREA NETWORK MECHANISM FOR A TERMINAL LOCATED IN A WIRELESS LOCAL AREA NETWORK

(75) Inventors: Donald Joong, Montreal (CA); Raj Sanmugam, Cornwall (CA); Samy Touati, Rosemere (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1062 days.

(21) Appl. No.: 10/226,334

(22) Filed: Aug. 23, 2002

(65) Prior Publication Data
US 2004/0037255 A1  Feb. 26, 2004

(51) Int. Cl.
H04Q 7/24 (2006.01)
(52) U.S. Cl. .................................. 370/338; 370/349
(58) Field of Classification Search .......... 370/352–356, 370/338, 328, 329, 349, 341, 401, 465, 466, 370/467
See application file for complete search history.

(56) References Cited

U.S. PATENT DOCUMENTS 6,353,745 B1  3/2002  Wehrend et al.  ............. 455/466
2004/0114553 A1*  6/2004  Jiang et al.  ................. 370/328
2005/0286466 A1*  12/2005  Tagg et al.  .................. 370/329
2006/0025175 A1*  2/2006  Lapstun et al.  ............ 455/556.1

FOREIGN PATENT DOCUMENTS

DE  100 04 032 A1  8/2001
EP  1 106 025 B1  2/2002
WO  WO 01/22691 A2  3/2001

* cited by examiner

Primary Examiner—Ajit Patel
(74) Attorney, Agent, or Firm—Ericsson Canada Inc.

(57) ABSTRACT

The present invention relates to a text control message for carrying control information from a Wireless Wide Area Network (WWAN) to a terminal in a Wireless Local Area Network (WLAN). The text message has a code for indicating to the terminal that the text message contains control information and a text portion being the control information. A logical node located in WWAN that sends control information to a terminal located in a WLAN. The logical node receives information regarding the terminal from a Wireless Serving Node (WSN) located in the WLAN. The logical node has knowledge of an access point connected to the WSN that currently serves the terminal in the WLAN. The logical node triggers, in a message center of the WWAN, the sending of the text message to the terminal.

10 Claims, 2 Drawing Sheets